United States Patent [19]

Holm-Kennedy et al.

[11] Patent Number: 4,926,693

[45] Date of Patent: May 22, 1990

[54] CONTACTLESS ACTUATOR PISTON PROXIMITY SENSOR

[75] Inventors: James W. Holm-Kennedy; Eric H. Kawamoto; Thomas T. Bopp, all of Honolulu, Hi.

[73] Assignee: The Research Corporation of the University of Hawaii, Honolulu, Hi.

[21] Appl. No.: 201,940

[22] Filed: Jun. 3, 1988

[51] Int. Cl.$^5$ .............................................. G01S 15/32
[52] U.S. Cl. ...................................... 73/597; 367/99; 367/102
[58] Field of Search ................. 73/579, 597, 602, 630, 73/596; 367/99, 101, 102

[56] References Cited

U.S. PATENT DOCUMENTS

| | | | |
|---|---|---|---|
| 3,108,469 | 10/1963 | Dyer et al. | 73/597 |
| 4,420,727 | 12/1983 | Rau | 367/99 |
| 4,512,194 | 4/1985 | Beuter | 73/579 |
| 4,542,652 | 9/1985 | Reuter et al. | 73/597 |
| 4,543,649 | 9/1985 | Head et al. | 367/99 |

Primary Examiner—John Chapman
Attorney, Agent, or Firm—James Creighton Wray

[57] ABSTRACT

This invention relates to contactless proximity sensing transducers and more particularly concerns a single crystal ultrasonic interferometer comprised of a piezoelectric crystal attached to a Pyrex plate for acoustic impedance matching purposes. When driven at the crystal's resonant frequency, the electrical impedance of the crystal becomes sensitive to the input acoustical impedance of the interferometric path length between the crystal and the target object. By monitoring the crystal impedance at a fixed frequency as target position is varied, the sensor is capable of determining the incremental displacement of the moving target. By monitoring the crystal impedance at a fixed target position as the driving frequency is varied, the sensor is capable of determining the absolute proximity of the target. The geometry of the piezoelectric crystal and the Pyrex plate are used to affect the resolution and frequency response of the sensor.

6 Claims, 3 Drawing Sheets

CONTACTLESS ACTUATOR PISTON PROXIMITY SENSOR

BACKGROUND OF THE INVENTION

Determination of the location of mechanical arms and linkages is important. Automation is assisted by mechanisms such as robotic grippers and mechanical arms requires accurate location information. For example, the automated manufacture of a system may require the assembly of parts. These parts must be properly placed in conjunction to one another. To successfully accomplish this function, the position of the part being placed must be known. This criterion is equivalent to the need to know the location of the mechanical linkages controlling the mechanical system which is moving and placing the part. The movement of these mechanical linkages is accomplished using actuators. Hydraulic actuators of choice often consist of a cylinder filled with a hydraulic oil and a movable piston, where the piston is mechanically linked to the movable parts of the mechanical assembly mechanism. Knowledge of the piston's location provides knowledge of the location of the moving parts of the mechanical mechanism. The resolution of the location of the moving parts of the mechanism are in direct relationship to the resolution of the piston location in the hydraulic actuator. Thus, the knowledge of the location of the piston in the cylinder is useful information in determining the location of the moving mechanical parts of mechanisms such as those used for automated assembly, robotics, etc. The precision of location of the actuator piston becomes especially critical for actuators of small size. Actuators of small size are desirable and useful for small mechanical systems, such as, for example, for small robotic grippers.

The method of location of the hydraulic actuator piston is preferably electrical in character in order to easily incorporate electrical controls. Further, a means of accurate piston location where the electrical output has a digital output is also useful.

While precise location knowledge of the activator piston for small systems is a desirable feature, a location determining system which is also applicable to large hydraulic actuators, and which is useful for actuators used in systems other than robotics, is also desirable.

The present invention relates to determining the precise location of a hydraulic actuator position with precision and providing electrical readout which can have digital features suitable for digital electronics use. Analog output is also easily provided.

SUMMARY OF THE INVENTION

The present invention relates to proximity sensors which determine the absolute proximity and the incremental displacement of moving objects. The invention uses a single crystal ultrasonic interferometer.

This invention relates to contactless proximity sensing transducers and more particularly concerns a single crystal ultrasonic interferometer comprised of a piezoelectric crystal attached to a Pyrex plate. When driven at the crystal's resonant frequency, the electrical impedance of the crystal becomes sensitive to the input acoustical impedance of the interferometric path length between the crystal and the target object. By monitoring the crystal impedance at a fixed frequency as target position is varied, the sensor is capable of determining the incremental displacement of the moving target. By monitoring the crystal impedance at a fixed target position as the driving frequency is varied, the sensor is capable of determining the absolute and relative proximity of the target. The geometry of the piezoelectric crystal and the Pyrex plate are used to affect the resolution and frequency response of the sensor.

In a preferred embodiment of the invention a hydraulic actuator piston proximity sensor has a piezoelectric crystal mounted on an acoustically coupling thin plate. The said piezoelectric crystal transmits ultrasonic energy through the said acoustically coupling thin plate towards a target piston. The electrical impedance of the said piezeoelectric crystal is monitored to determine piston position.

In a first embodiment, the piezoelectrical crystal is driven at its resonant frequency. The displacement of the said target piston is monitored by detecting maximas and minimas in the electrical impedance of the said piezoelectric crystal.

In a second embodiment the piezoelectric crystal is driven by a modulated frequency near the said piezoelectric crystal's resonant frequency. The absolute proximity of the said target piston is determined by measuring the change in frequency between two consecutive maximas in the electrical impedance of the said piezoelectric crystal.

The first and second embodiments are used separately or in conjunction.

The present invention can be used in many ways to determine exact position and precise displacements for objects, for example pistons in actuators, such as tiny robotic finger actuators, and in delicate movements.

The present invention provides the application of a single crystal ultrasonic interferometer as an actuator piston proximity sensor.

These and further and other objects and features of the invention are apparent in the disclosure which includes the above and ongoing written description, including the claims and the drawings.

DETAILED DESCRIPTION OF THE DRAWINGS

Figure 1:
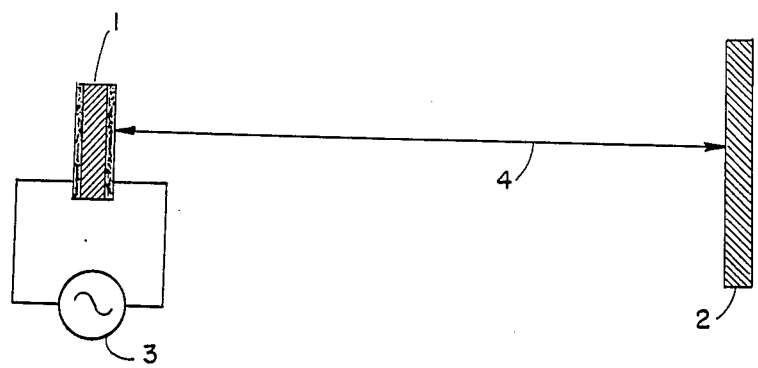
FIG. 1 is a schematic diagram of the single crystal ultrasonic interferometer.

The basic interferometer structure shown in FIG. 1 consists of a piezoelectric crystal 1 and a parallel reflector 2, both immersed in the hydraulic fluid. When the crystal is driven at its resonant frequency by an external source 3, the crystal's electrical impedance becomes sensitive to the input acoustical impedance of the interferometric pathlength L 4. Thus, any change in the input acoustical impedance of the interferometric path can be detected by monitoring the current drawn by the crystal. As the reflector is moved, and the interferometric pathlength L is changed, the crystal current reaches alternating maxima and minima. The amplitude of the crystal current maxima and minima decreases as the interferometric pathlength is increased due to attenuation in the medium. The reflector displacement between adjacent crystal current maxima or minima corresponds to a half-wavelength change in the interferometric wavelength.

Figure 2:
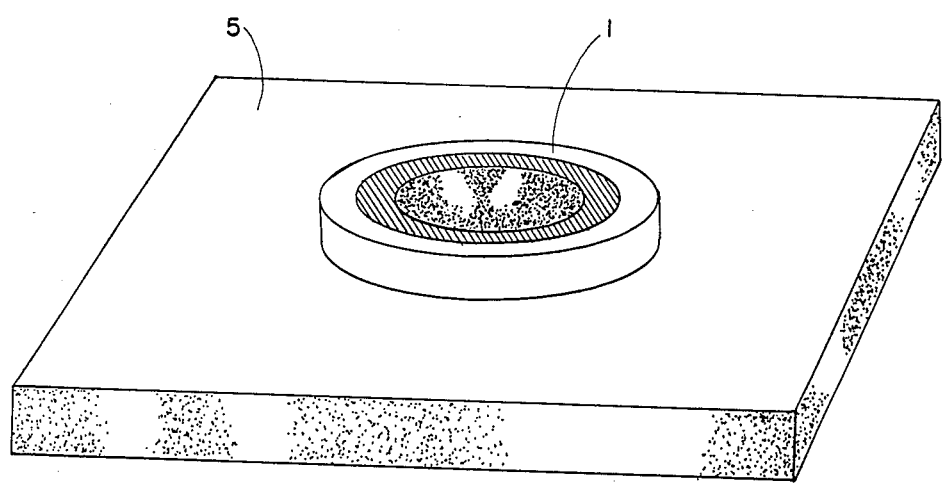
FIG. 2 is an oblique view of the piezoelectric crystal mounted on an acoustically coupling thin plate.
Figure 3:
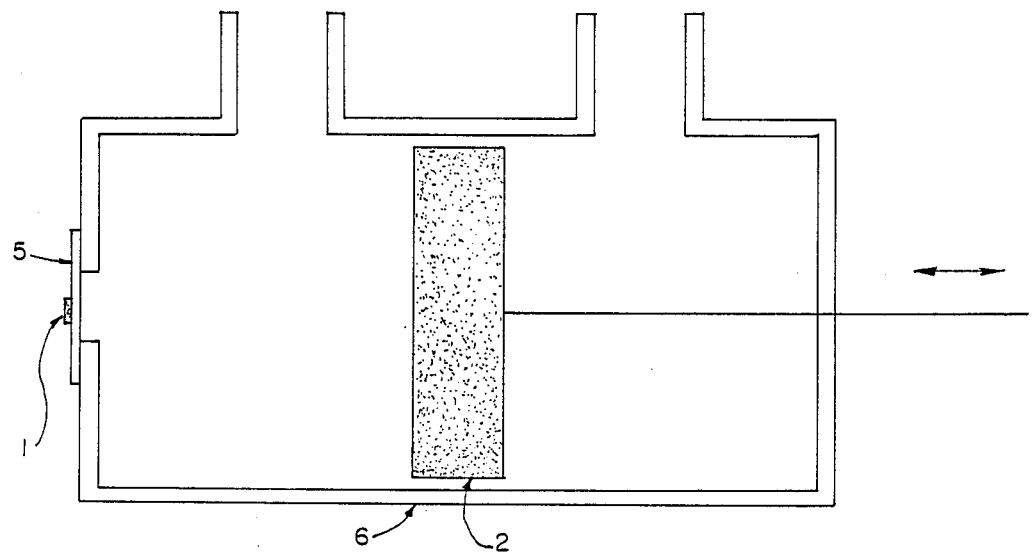
FIG. 3 is a cross-sectional view of the preferred embodiment.

The preferred embodiment of the present invention is a piezoelectric crystal 1 mounted on a Pyrex plate 5 as shown in FIG. 2. The structure is mounted within a hydraulic actuator cylinder 6 (which contains a hydraulic oil, or other fluid of relatively low acoustic attenuation) parallel to the target piston 2 as shown in FIG. 3. The piezoelectric ceramic of choice is Lead Zirconate Titanate (PZT-5A) which exhibits a high piezoelectric coefficient, a high mechanical Q, and a high Curie temperature. The crystal mounting requirements are such that the crystal can oscillate with the front surface fixed and the back surface free. In the present case, this is accomplished by bonding the crystal to a thin Pyrex plate that also serves as an intermediate medium which helps to improve the overall acoustic matching between the crystal and the hydraulic fluid.

Figure 4:
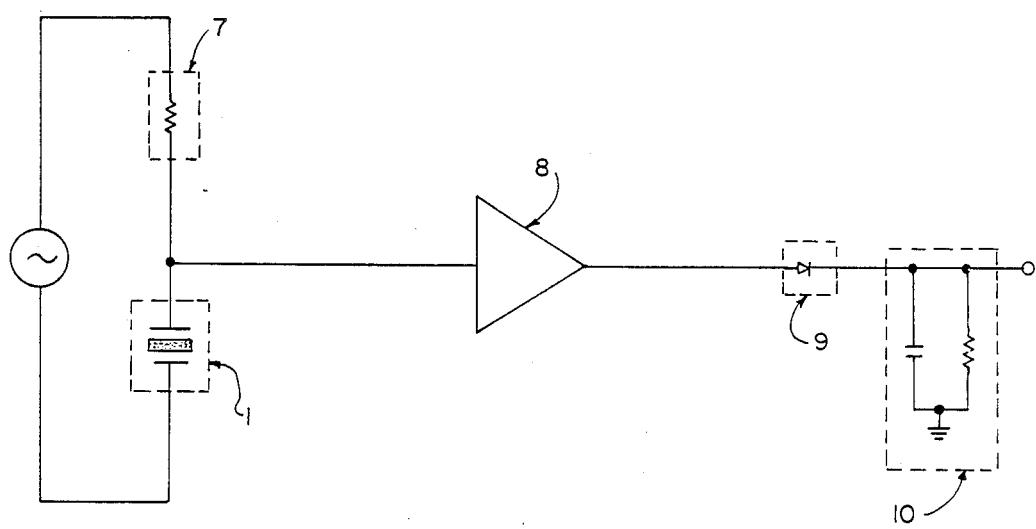
FIG. 4 is a schematic representation of the impedance measuring circuit.

The piezoelectric crystal impedance is monitored with the circuit shown in FIG. 4. The piezoelectric crystal 1 is placed in series with a known resistor 7. The AC voltage across the crystal is fed through a high speed buffer amplitude 8 and converted to a DC voltage with a half-wave rectifier 9 and a low-pass filter 10.

Figure 5:
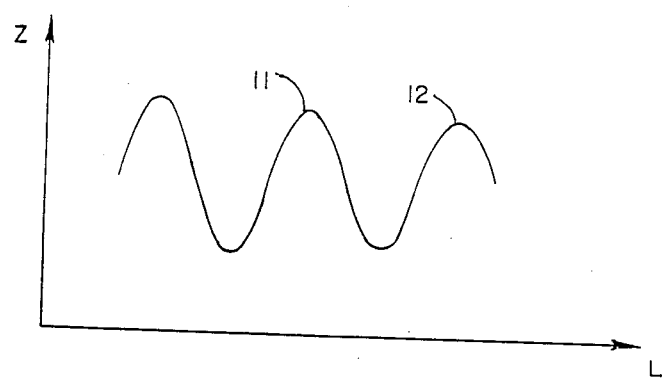
FIG. 5 is the crystal impedance Z plotted versus the interferometric pathlength L.

The invention operates in the following manner:

The piezoelectric crystal is driven at its resonant frequency as determined by its geometry. As the actuator piston position and interferometric pathlength L is varied, the crystal impedance Z varies due to the phase shift between the transmitted and the reflected waves within the fluid column of length L as shown in FIG. 5. By counting the peaks 11, 12 in crystal impedance Z as the actuator piston moves, the actuator piston displacement can be monitored. Assuming that both the maximas and the minimas of Z can be detected, the resolution of the invention is $$\Delta L = \frac{\lambda}{4} = \frac{c}{4f}. \tag{1}$$

Due to attenuation in the medium, the direction of actuator piston movement can be determined by comparing the amplitudes of consecutive crystal impedance maximas. For example in FIG. 5, a decrease in the amplitude of an impedance maxima from the previous impedance maxima indicates actuator piston movement away from the crystal.

For initial calibration, the electrical impedance of the piezoelectric crystal can be monitored as the crystal driving frequency is modulated near the crystal's resonant frequency. The crystal impedance Z is maximized at interferometric path lengths equal to integral multiples of half-wavelengths. For an arbitrary maxima of crystal impedance Z at a frequency $f_1$ with acoustic wavelength $\lambda_1$ ($\lambda_1 = c_m/f_1$), the interferometric path length $L_1$ is $$L_1 = \left(\frac{\lambda_1}{2}\right)n_1 = \left(\frac{c_m}{2f_1}\right)n_1 \tag{2}$$

where $n_1$ is a dimensionless integer ($n_1 \gg 1$) representing the number of half-wavelengths along the interferometric path length $L_1$. As the crystal driving frequency is increased, another maxima of crystal impedance Z is encountered at frequency $f_2$ with acoustic wavelength $\lambda_2$ where $$L_2 = \left(\frac{\lambda_2}{2}\right)n_2 = \left(\frac{c_m}{2f_2}\right)n_2 \tag{3}$$

and $n_2 = n_1 + 1$. Assuming that the reflector position is constant as the driving frequency is varied ($L_1 = L_2 = L$), the change in frequency $\Delta f$ between $f_1$ and $f_2$ is $$\Delta f = f_2 - f_1 = \frac{c_m}{2L} \tag{4}$$

By measuring the change in frequency $\Delta f$ between two consecutive Z maximas and with a known value of the speed of sound in the medium $c_m$, the interferometric path length L can be determined from (4)

$$L = \left(\frac{c_m}{2\Delta f}\right) \tag{5}$$

With a Pyrex plate of thickness $t_g$ between the crystal and the hydraulic fluid, the distance $L'$ between the glass and the reflector is $$L' = c_m\left(\frac{1}{2\Delta f} - \frac{t_g}{c_g}\right) \tag{6}$$

where $c_g$ is the speed of sound in glass.

By sweeping the driving frequency and measuring the frequency separation $\Delta f$ between two consecutive (or more) resonances an absolute determination of the distance $L'$ between the reflector and the Pyrex plate can be obtained from (6) or, in the case of more than two resonances in $\Delta f$, from an equation similar to (6).

More than two consecutive Z maximas can be measured. The larger the separation $\Delta f$ between the frequency separated maximas, for a given resolution of frequency, the better the precision of the resolution of L. (L is calculated from $\Delta f$ using an equation similar to Eq. 5). Equation 5 is simply multiplied by the number of resonance peaks less 1, observed in the frequency range of $\Delta f$.

Figure 6:
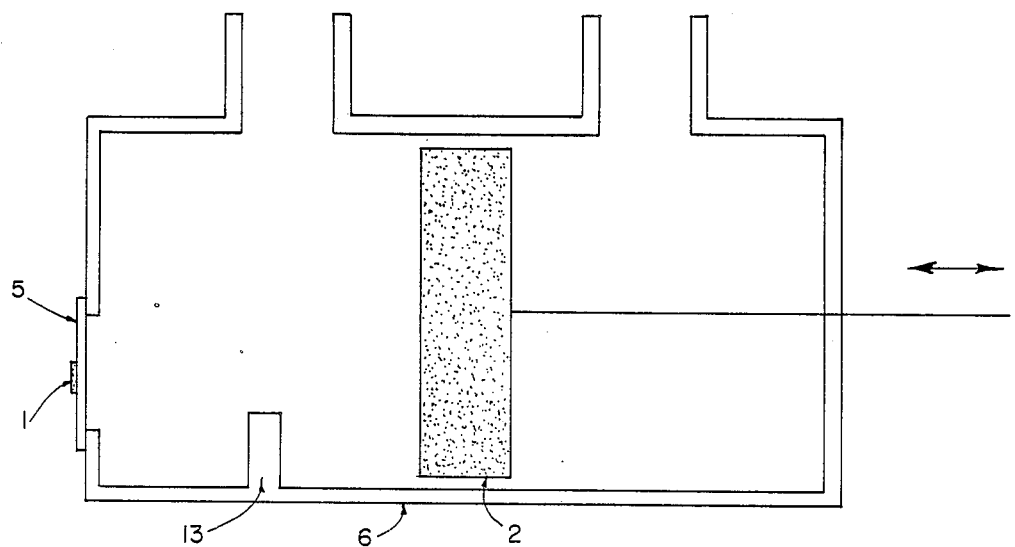
FIG. 6 shows the step in the actuator cylinder wall to create a discontinuity in the path of the ultrasonic wave.

Temperature compensation can be achieved by introducing a discontinuity of the medium in the path of the ultrasonic wave to calibrate the value of the speed of sound in the medium $c_m$ which is a function of the temperature. The discontinuity of the medium can be achieved by adding a step 13 in the walls of the actuator as shown in FIG. 6. As the driving frequency is swept, the signal reflected from the discontinuity is superimposed onto the signal reflected from the target (resonance). Since the distance from the crystal to the discontinuity is a known constant, the temperature dependent velocity of sound $c_m$ in the medium can be determined from (6). Alternatively, a temperature monitoring sensor can be placed in the fluid and correction made for the change in the properties of the fluid with temperature. For example a change in the velocity of sound, can be corrected electronically or by using a microprocessor, or by other means.

The use of resonance has several advantages over simple ranging and other methods of actuator piston location. Resonance provides for the storage of energy, in this case storage of acoustic energy. The relationship between the stored energy and the energy lost through various loss mechanisms is characterized by the quality factor Q. The higher the Q, the sharper the resonance, i.e., more precise is the resonance and thus the more precise is the determination of L. The quality factor Q is dependent upon the acoustic losses in the system. Thus, the loss of acoustic energy in the resonant cavity should be minimized. This can be accomplished by using a low loss acoustic conductive medium in the actuator cylinder. Losses can also be minimized by using special vibrational field configurations, called modes of vibration. These modes are similar to those known in the electromagnetic (microwave resonator and other) arts, as well as in the acoustical art.

Said modes can be selected by selecting the geometry of the resonant cavity and by location of the acoustic transducer(s).

The dimensions of the cavity can be small or large. Of special interest for the present invention is actuators of very small size. As an example a cylinder cavity may be 0.5 inches in length and 0.2 inches in diameter. A piston may travel 0.3 inches, and its location may be resolved to approximately +0.001 inches.

In practice the acoustic transducer may be positioned in one of many possible locations including on one end of the cylinder, the other end or in a sidewall of the cylinder or for that matter on the piston. The transducer may be positioned away from the actuator if good acoustic coupling to the actuator is maintained. Piston location to within one mil (or ±0.001 inches) or less is attainable with a high frequency acoustic transducer (e.g., a 30 MHz transducer), where the resonant quality factor Q is sufficiently high (i.e. when acoustic losses are kept low). The actuator dimensions can have different values. Cylinder length of a fraction of an inch and a cylinder diameter of a fraction of an inch are realistic.

In addition to the use of one frequency, two or more than two frequencies can be used. In particular, by using more than two resonant frequencies (e.g., via frequency modulation of the acoustic transducer), the temperature dependence of the resonance on the temperature dependent velocity of sound ($C_m$) in the fluid can be eliminated. In general, if there are N variables, the use of N different resonant frequencies can be used to determine the values of the N variables. The multiple frequencies can be achieved through use of multiple transducers or through the frequency modulation of a single transducer. Since operation is at particular frequencies, narrow band filters may be employed advantageously to exclude ambient noise and to increase the sharpness of the resonance and thus to improve precision of locating the piston position.

While location of the resonance peak affords excellent piston position resolution, a still better resolution can be achieved by also inspecting the resonance minima, the resonance half power point, the resonance quarter power point, the value of the slope of the resonance curve (transducer impedance) versus actuator position locations, and so forth.

In general, the higher the resonant frequency, the higher the actuator piston resolution.

A typical example of dimensions of the device would be piezoelectric transducer of ½ inch diameter in a ¾ inch diameter cylinder. The transducer resonant frequency would be 5, 10, or 15 or 30 MHz. The resolution counting adjacent peaks at a single resonant frequency of about 15 MHz would be ±0.001 and ±20. mils absolute length using adjacent resonances with improved absolute resolution improving by using multiple resonance and transducer frequency modulation. The distance from the transducer to the piston in this example would be 0 to 5 inches.

While the invention has been described with reference to specific embodiments, modifications and variations of the invention may be made without departing from the scope of the invention which is defined in the following claims.

We claim:

1. A hydraulic actuator piston proximity sensor comprising: a chamber, an acoustic transducer, acoustical coupling means for acoustically coupling the transducer to the chamber, electrical driving means for driving the transducer whereby the transducer transmits ultrasonic energy through the said acoustically coupling means into the chamber, and monitoring means for monitoring electric characteristics of the transducer for determining piston position, wherein the transducer is a piezoelectric crystal and said driving means include means for driving the transducer by a modulated frequency over a frequency range near the piezoelectric crystal's resonant frequency and wherein the monitoring means comprises means for determining the absolute proximity of the piston by measuring change in frequency between extreme in electrical impedance of the piezoelectric crystal by the monitoring means.

2. The sensor of claim 1 wherein said driving means further includes driving means for the transducer at its resonant frequency and wherein the monitoring means includes means for monitoring displacement of the piston by detecting maximas and minimas in the electrical impedance of the transducer in the monitoring means.

3. A hydraulic actuator piston proximity sensor comprising: a chamber, an acoustic transducer, acoustical coupling means for acoustically coupling the transducer to the chamber, electrical driving means for driving the transducer whereby the transducer transmits ultrasonic energy through the said acoustically coupling means into the chamber, and monitoring means for monitoring electric characteristics of the transducer for determining piston position, wherein the transducer is a crystal said driving means drives the transducer crystal at or near resonant frequency and the displacement of a piston in the chamber is monitored by detecting the electrical characteristics of the transducer in the monitoring means wherein said driving means further includes means for driving the transducer by modulated frequency near the transducer's resonant frequency and wherein the monitoring means includes means for monitoring absolute proximity of the piston by measuring change in frequency between maxima in the electrical impedance of the transducer by the monitoring means.

4. The method of sensing hydraulic actuator piston proximity comprising: mounting a transducer, acoustically coupling the transducer to a chamber, vibrating the transducer and producing ultrasonic energy, transmitting the ultrasonic energy from the transducer through acoustical coupling into the chamber, and monitoring an electric characteristic of the transducer to determine piston position driving said transducer at or near its resonant frequency and monitoring displacement of the piston by detecting maxima and minima and intermediate values in the electrical characteristic of the transducer, and driving said transducer by a modulated frequency near the resonant frequency of said transducer and determining the absolute proximity of the piston by measuring the change in frequency between maxima in electrical impedance of the said transducer.

5. The method of sensing hydraulic actuator piston proximity comprising: mounting a transducer, acoustically coupling the transducer to a chamber, vibrating the transducer and producing ultrasonic energy, transmitting the ultrasonic energy from the transducer through acoustical coupling into the chamber, and monitoring an electric characteristic of the transducer to determine piston position, further comprising driving said transducer by a modulated frequency near the resonant frequency of said transducer and determining the absolute proximity of the said actuator piston by measuring the change in frequency between maxima in the electrical impedance of the transducer crystal.

6. The method of claim 5 further comprising driving said transducer at its resonant frequency and monitoring displacement of the piston by detecting maxima and minima in the electrical impedance of said transducer.

* * * * *